United States Patent
Bertelli

(10) Patent No.: US 11,828,250 B2
(45) Date of Patent: Nov. 28, 2023

(54) HYDROGEN CELL

(71) Applicant: E.HY. Energy Hydrogen Solution S.p.A., San Giuliano Terme (IT)

(72) Inventor: Marco Bertelli, San Giuliano Terme (IT)

(73) Assignee: E.HY. ENERGY HYDROGEN SOLUTION S.P.A., San Giuliano Terme (IT)

( * ) Notice: Subject to any disclaimer, the term of this patent is extended or adjusted under 35 U.S.C. 154(b) by 85 days.

(21) Appl. No.: 17/495,358

(22) Filed: Oct. 6, 2021

(65) Prior Publication Data
US 2022/0106929 A1    Apr. 7, 2022

(30) Foreign Application Priority Data
Oct. 7, 2020  (IT) .................. 102020000023602

(51) Int. Cl.
*F02M 21/02*    (2006.01)
*F02B 43/02*    (2006.01)
*F23D 14/22*    (2006.01)
*F23D 14/66*    (2006.01)
*H01M 8/0606*   (2016.01)
*F02B 43/10*    (2006.01)

(52) U.S. Cl.
CPC ......... *F02M 21/0206* (2013.01); *F02B 43/02* (2013.01); *F23D 14/22* (2013.01); *F23D 14/66* (2013.01); *H01M 8/0606* (2013.01); F02B 2043/106 (2013.01)

(58) Field of Classification Search
CPC ..... F02M 21/00; F02M 21/02; F02M 21/0203
See application file for complete search history.

(56) References Cited

U.S. PATENT DOCUMENTS

| | | | | |
|---|---|---|---|---|
| 4,663,932 A | * | 5/1987 | Cox | F03H 99/00 505/902 |
| 4,850,537 A | * | 7/1989 | Gourdine | F24F 5/0007 239/406 |
| 4,891,600 A | * | 1/1990 | Cox | H02K 44/02 315/501 |
| 6,649,293 B1 | | 11/2003 | Jones | |
| 2001/0036568 A1 | | 11/2001 | Farkash et al. | |
| 2004/0247967 A1 | * | 12/2004 | Resnick | H01M 8/04291 429/441 |
| 2011/0115223 A1 | * | 5/2011 | Stahlkopf | H02P 9/04 290/7 |
| 2022/0021290 A1 | * | 1/2022 | Mills | H02K 44/10 |

(Continued)

FOREIGN PATENT DOCUMENTS

WO    2016009385 A1    1/2016

OTHER PUBLICATIONS

Italian Search Report dated Jun. 9, 2021.

*Primary Examiner* — John Kwon
(74) *Attorney, Agent, or Firm* — Vorys, Sater, Seymour and Pease LLP

(57) ABSTRACT

A hydrogen combustion device including a first plate including a plurality of through holes; a second plate approached to the first plate so as to define a chamber between the same plates; a heater of the first plate; an injection system configured to inject hydrogen into the chamber through the holes; and a generator defining a potential difference between the plates so that the hydrogen in the chamber defines an electric arc between the plates.

10 Claims, 2 Drawing Sheets

(56) References Cited

U.S. PATENT DOCUMENTS

2022/0106929 A1\* 4/2022 Bertelli .................. F22B 1/003
2023/0150817 A1\* 5/2023 Allam .................... B01J 8/0257
423/651

\* cited by examiner

HYDROGEN CELL

FIELD OF THE INVENTION

The present invention relates to a combustion device and in detail to a hydrogen cell of the type specified in the preamble of the independent claims.

In particular, the invention relates to a hydrogen fuel cell, also known as a fuel cell or fuel cell, which makes it possible to exploit hydrogen to produce heat that can be used for example to heat and obtain electricity.

DESCRIPTION OF THE PRIOR ART

As known, hydrogen cells convert the chemical energy of hydrogen into electricity and heat without using thermal cycles.

Such cells are based on the fact that hydrogen is a gas capable of being easily ionized and on the use as an oxygen comburent capable of reacting with hydrogen giving heat and a harmless product such as water.

The known cells have an anode saturated with oxygen present in the air and in which oxygen is reduced, and a cathode in which hydrogen is oxidized; these reactions make it possible to obtain thermal energy to heat water.

The electrodes are immersed in the electrolyte, a concentrated solution of potassium hydroxide (KOH), and coated with catalysts to increase the speed of the electrode reactions.

Some examples of known cells are: alkaline cells using potassium hydroxide as the electrolyte; Polymer Electrolyte Fuel Cells (PEFC) using a high conductivity polymeric membrane as electrolyte; molten carbonate cells (MCFC, Molten Carbonate Fuel Cell) wherein the electrolyte used is a solution of alkaline carbonates melted at the operating temperature of the cell; methanol cells.

The known art described includes some important drawbacks.

In particular, known cells are particularly complex, making their practical applications in the production of energy excessively expensive.

This aspect is accentuated by the fact that molecular hydrogen has an energy density per unit volume lower than that of many other combustibles which, up to now, has made its use not very convenient to produce energy.

An important drawback resides in the fact that the cells have a high purchase and maintenance cost, making their use even more limited. This aspect is accentuated by their constructive complexity and the high cost of disposal.

A not secondary drawback is that the cells do not allow an optimal use of the products of the chemical reaction and therefore have a high energy expenditure and therefore a relatively low efficiency.

In this situation, the technical task underlying the present invention is to devise a hydrogen cell capable of substantially obviating at least part of the aforementioned drawbacks.

Within the scope of said technical task, an important object of the invention is to obtain a hydrogen cell of relatively simple construction and therefore of low construction and maintenance cost.

Another important object of the invention is to provide a hydrogen cell capable of having an optimal use of the products of the chemical reaction and therefore of high efficiency.

SUMMARY OF THE INVENTION

The technical task and the specified aims are achieved by a hydrogen cell as claimed in the annexed claim 1. Examples of preferred embodiment are described in the dependent claims.

BRIEF DESCRIPTION OF THE DRAWINGS

The characteristics and advantages of the invention are clarified below by the detailed description of preferred embodiments of the invention, with reference to the accompanying figures, in which:

the FIG. 1 shows, in scale, a hydrogen cell comprising a combustion device according to the invention;

Figure 1:
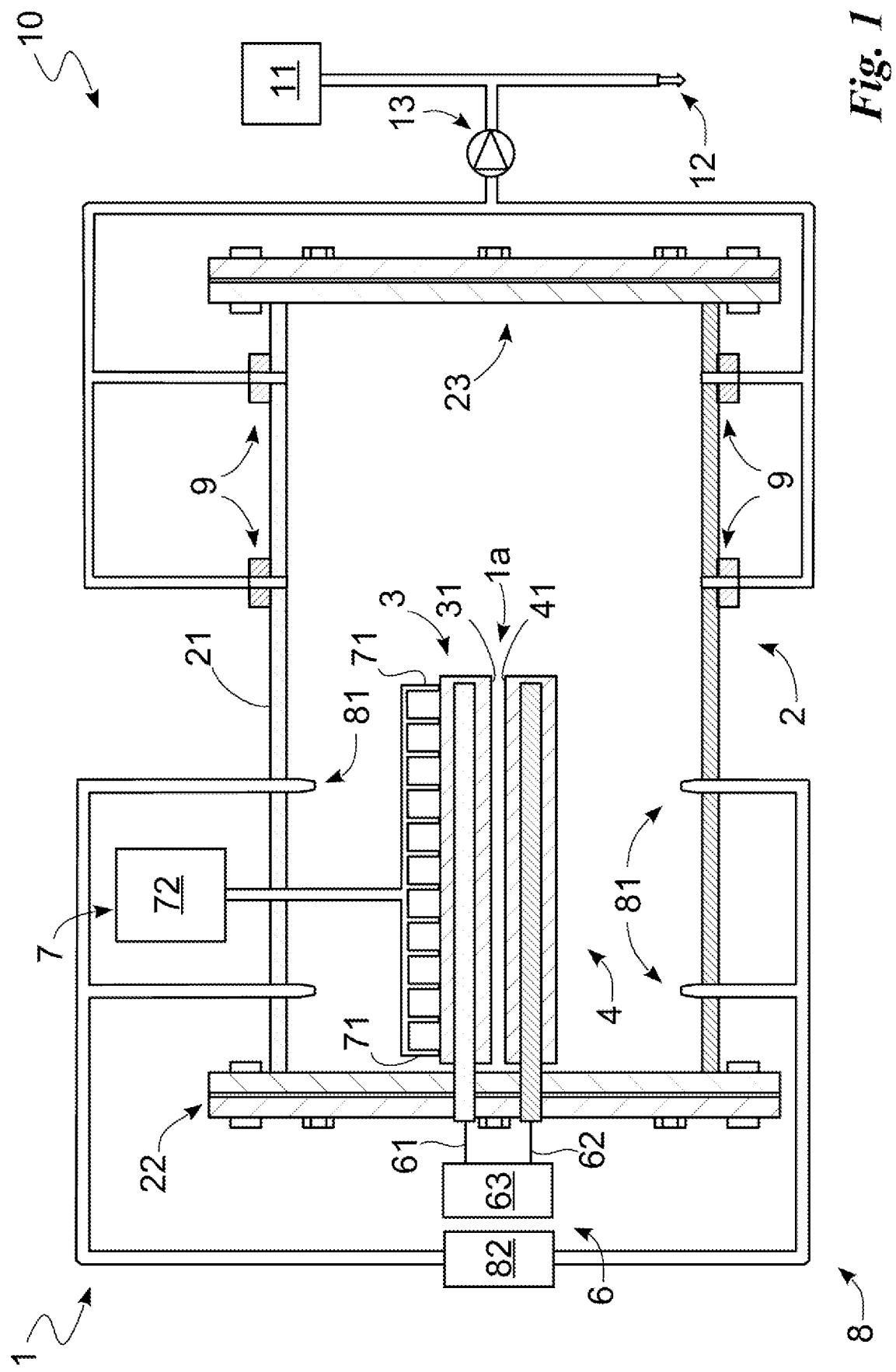
Figure 3:
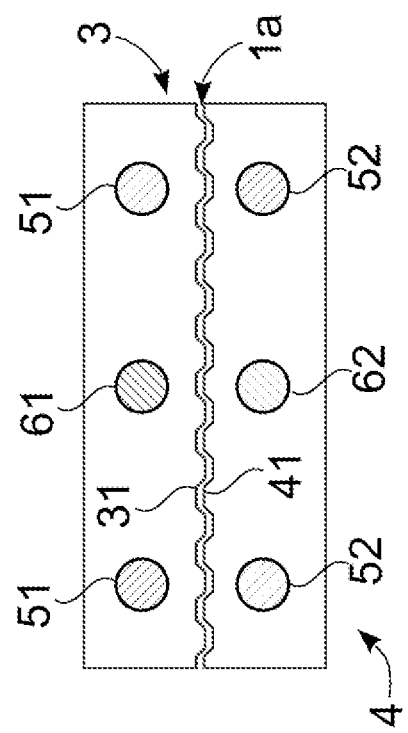
Figure 2:
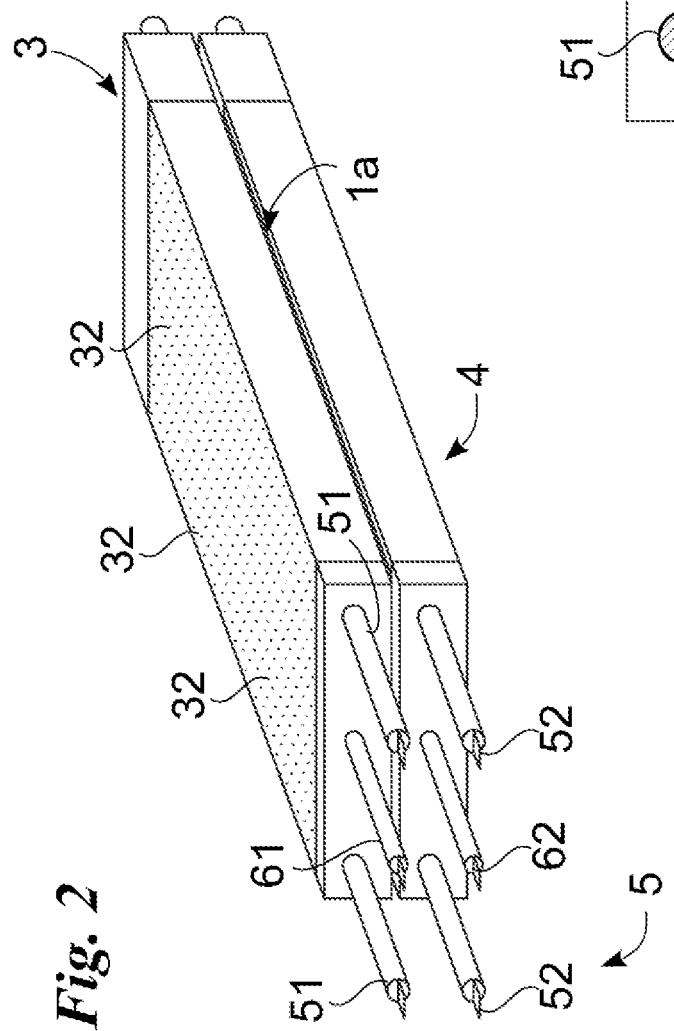

the FIG. 2 illustrates, in scale, of an assembly of hydrogen combustion device; and the FIG. 3 shows, in scale, a second view of the assembly of FIG. 2.

DESCRIPTION OF THE PREFERRED EMBODIMENTS

In the present document, the measurements, values, shapes and geometric references (such as perpendicularity and parallelism), when associated with words like "about" or other similar terms such as "approximately" or "substantially", are to be considered as except for measurement errors or inaccuracies due to production and/or manufacturing errors, and, above all, except for a slight divergence from the value, measurements, shape, or geometric reference with which it is associated. For instance, these terms, if associated with a value, preferably indicate a divergence of not more than 10% of the value.

Moreover, when used, terms such as "first", "second", "higher", "lower", "main" and "secondary" do not necessarily identify an order, a priority of relationship or a relative position, but can simply be used to clearly distinguish between their different components.

The measurements and data reported in this text are to be considered, unless otherwise indicated, as performed in the International Standard Atmosphere ICAO (ISO 2533).

Unless otherwise specified, as results in the following discussions, terms such as "treatment", "computing", "determination", "calculation", or similar, refer to the action and/or processes of a computer or similar electronic calculation device that manipulates and/or transforms data represented as physical, such as electronic quantities of registers of a computer system and/or memories in, other data similarly represented as physical quantities within computer systems, registers or other storage, transmission or information displaying devices.

With reference to the Figures, the hydrogen combustion device according to the invention is globally indicated with the number 1.

It is configured to be fed by a feed gas comprising at least hydrogen. In particular, it identifies a burner capable of using a feed gas as combustible for the production of thermal energy, preferably heat.

The feed gas is identifiable as a gas mixture comprising a combustible gas (preferably hydrogen) such as and an oxidizing gas (preferably oxygen). It can be a mixture of hydrogen and oxygen and suitably syngas (or synthesis gas).

The hydrogen content in the feed gas can be substantially at least equal to 50% in detail to 70%. It can be substantially comprised between 70% and 90% in detail between 80% and 90% and for the accuracy substantially equal to 85%.

The oxygen content in the feed gas can be substantially less than 50% in detail at 30%. It can be substantially between 5% and 30% in detail between 10% and 20% and for the accuracy substantially equal to 15%.

Said % are determined in volume ratio.

The combustion device 1 can comprise a box-like body 2 defining a housing volume for at least part of the components of the cell.

The box-like body 2 can define a longitudinal axis.

The box-like body 2 comprises at least a base and a hollow body 21 closed by said at least one base. In detail, it comprises a first base 22; a second base 23 and the hollow body 21 is closed by said bases 22 and 23.

The hollow body 21 can expand mainly along said longitudinal axis.

The hollow body 21 can be cylindrical.

The combustion device 1 can comprise at least one pair of plates and preferably a single copy of plates.

Each pair of plates comprises a first plate 3 defining a first surface 31; and a second plate 4 defining a second surface 41 parallel and facing/oriented to the first surface 31 and not in contact with the first surface 31 so as to define a chamber 1*a* between said surfaces 31 and 41.

The plates 3 and 4 can be placed in the housing volume and optionally integral with a base (for example the first base 21).

The surfaces 31 and 41 can be defined as active in that they define the chamber 1*a* inside which the hydrogen ionization takes place and, consequently, the combustion of said hydrogen with therefore the production of heat. The surfaces 31 and 41 define two opposite faces/bases of the chamber 1*a*.

The surfaces 31 and 41 can be substantially parallel to the longitudinal axis.

The distance between the surfaces 31 and 41 and therefore the height of the chamber 1*a* can be substantially less than 5 cm, in detail at 1 cm, in more detail at 0.5 cm, in more detail still at 0.3 cm and for the accuracy substantially between 0.05 cm and 0.2 cm. Preferably it is almost equal to 0.1 cm.

Said distance between the surfaces 31 and 41 can be practically constant.

In some cases, the first surface 31 can be indented and the second surface 41 can be indented in negative with respect to the first surface 31 so as to keep the distance between the surfaces 31 and 41 constant (FIG. 3).

The first plate 3 can comprise at least one through hole 32 and in detail a plurality of through holes 32 having suitably preferred extension axes substantially parallel to each other.

Each hole 32 is configured to allow at least the hydrogen and preferably the feed gas (or rather the hydrogen and the comburent preferably identified as oxygen) to pass through the first plate 3 and then enter the chamber 1*a* with an incident/directed flow against the second plate 4. Each hole 32 can have a preferred extension axis substantially transverse and in detail substantially perpendicular to the first surface 31.

Each hole 32 can have a diameter substantially equal to at least 0.05 cm, in detail 0.1 cm and for the accuracy substantially between 0.1 cm and 0.3 cm. 100° C. Preferably said diameter is substantially equal to 0.15 cm.

The holes 32 can have a constant section. Alternatively, they can be tapered with for example maximum section at the first surface 31 or minimum section at the first surface 31.

The first plate 3 can be made of conductive material and in metal detail such as composed of ferrous materials. It can be tungsten.

The second plate 4 can be without holes.

The second plate 4 can be made of conductive material and metallic detail such as for example composed of ferrous materials. It can be tungsten.

The combustion device 1 can comprise a heater 5 of at least the first plate 3 and optionally of both plates 3 and 4.

The heater 5 can comprise at least one resistor 51 configured to heat the first plate 3 and therefore suitably an additional resistor 52 configured to heat the second plate 4.

The resistor 51 can be integrated in the first plate 3.

The additional resistor 52 can be integrated in the second plate 4.

The heater 5 is configured to define for at least the first plate 3 a preheating temperature substantially at least equal at 70° C. and in detail at 100° C. Preferably said temperature is substantially between 100° C. and 250° and more precisely between 100° C. and 150° C.

The resistors 51 and 52 can be in the housing volume and suitably connected to an electrical power supply system external to the box-like body 2.

The combustion device 1 can comprise at least one generator 6 configured to actuate a potential difference between the plates 3 and 4.

It defines said potential difference between said plates 3 and 4.

The plates 3 and 4 can thus constitute the plates a condenser fed by said generator 6.

The plates 3 and 4 therefore identify the plates/electrodes of a condenser in which the gas in chamber 1*a* identifies the dielectric. The charge is thus stored on the first surface 31 and on the second first surface 41. Therefore, outside the plates 3 and 4 there will be an electric field equal to zero, while between the surfaces 31 and 41 and therefore in the chamber 1*a* the electric field is maximum.

Said potential difference is configured to define (and in detail realize) in the chamber 1*a* and to be precise between the plates 3 and 4 an electric arc. This arc ionizes the hydrogen in the chamber 1, suitably reached there by crossing the first plate 3 and then the heater from the heater 5. The hydrogen thus ionized, as better described below, gives rise therefore to an exothermic combustion process (in detail to an oxidation process using the oxygen present in the feed gas) which develops heat heating the plates 3 and/or 4 and suitably the feed gas by reducing the contribution of the heater 5.

The potential difference between the plates 3 and 4 can be substantially at least equal to 4000V and in detail to 5000V. In some cases the potential difference between plates 3 and 4 can take values of some tens of thousands of Volts.

Preferably the generator 6 is configured to define said potential difference with a low amperage. Conveniently, it is configured to define the potential difference with a supply current, preferably continuous, of substantially less than 1 A in detail at 0.1 A and in detail substantially comprised between 0.05 A and 0.01 A. Said supply current can have an amperage substantially equal to 0.03 A.

The generator 6 can comprise at least a first electrode 61 and a second electrode 62 associated respectively with the first plate 3 and with the second plate 4 so as to define said potential difference suitably with called supply current.

The electrodes 61 and 62 can be integrated in the plates 3 and 4 and suitably electrically powered by a power supply system external to the box-like body 2. The first electrode 61 can be in one piece with the first plate 3 which therefore identifies said first electrode and/or the second electrode 61 can be in one piece with the second plate 4 which therefore identifies said second electrode.

The first electrode 61 and conveniently the first plate 3 can identify the cathode; and the second electrode 61 and conveniently the second plate 4 can identify the anode. Alternatively, the first electrode 61 and conveniently the first plate 3 can identify the anode; and the second electrode 61 and conveniently the second plate 4 can identify the cathode.

The combustion device 1 can comprise an injection system 7 configured to introduce the feed gas into the chamber 1a through at least part and in detail all of the holes 32 so that the hydrogen, in detail the feed gas, passes through the first plate 3 and reaches the chamber 1a where, exploiting the potential difference between the plates 3 and 4, it defines between the plates 3 and 4 at least one electric arc suitably ionizing the hydrogen.

It can be seen how the feed gas in the chamber 1a, passing through the first plate 3, is heated in detail to at least said preheating temperature.

In detail, in chamber 1a there are the conditions (or rather the temperature of the feed gas and in particular of at least hydrogen thanks to the heater 5; the necessary intensity of the electric field (with respect to the density and/or concentration of gas) thanks to the generator 6) so that an electric arc is generated in the dielectric between plates 3 and 4, or rather in the feed gas, which ionizes said hydrogen.

The injection system 7 is placed in a fluid passage connection with the holes 32 on the opposite side to the first surface.

The injection system 7 is configured to introduce feed gas at a working pressure preferably substantially at least equal to 1 bar and in detail at 1.5 bar. Preferably the working pressure is substantially between 2 bar and 5 bar and in detail between 2 bar and 3 bar and preferably substantially equal to 2.5 bar.

The injection system 7 is configured to inject feed gas without interruption.

The injection system 7 can comprise, for each hole 32, at least one injector 71 for injecting the feed gas (hence hydrogen and suitably oxygen) into the hole 32; suitably a gas feeder 72 in fluid passage connection with said at least one injector 71; and more suitably a block configured for the regulation and control of the feed gas injection.

The injector 71 is constrained to a hole 32 on the opposite side to the first surface 31.

The power supply 72 can be external to the housing volume.

The feeder 72 may comprise a compression member configured to inject the feed gas at said working pressure.

The feeder 72 may comprise a feed gas storage cylinder and/or a hydrogen production system and feed gas in detail.

The combustion device 1 can comprise an adduction member 8 configured to introduce a liquid into the housing volume and in detail against said plates 2 and 3.

The adduction member 8 is configured to introduce a liquid which, due to the high temperatures in the housing volume, vaporizes.

The liquid can be preferably demineralized water.

The adduction member 8 is configured to inject a liquid at an inlet pressure preferably substantially at least equal to 1 bar at least equal to 1 bar and in detail substantially between 1 bar and 120 bar and more precisely between 60 bar and 90 bar. Preferably the inlet pressure is substantially equal to 80 bar.

The adduction member 8 can comprise at least one nozzle 81 configured to introduce the liquid into said volume; suitably a supply unit 82 of the liquid suitably at said inlet pressure; and more conveniently at least one valve for regulating and controlling the introduction of liquid.

The nozzle 81 can be integrated in the box-like body 2.

It is able to introduce the liquid into the housing volume by suitably directing it against the plates 2 and 3 in detail against the chamber 1a.

The combustion device 1 can comprise at least one connector 9 adapted to allow at least the aforesaid vaporized liquid to escape.

The combustion device 1 can comprise a control board for the operation of the cell itself.

The combustion device 1 can be part of a hydrogen cell 10 configured to use the vaporized liquid produced by the device 1 for heating and/or energy production. Cell 10 it can be a device for exploiting the energy produced by the device 1. It can comprise at least one combustion device 1 for said hydrogen.

The hydrogen cell 10 can comprise a gas separation unit preferably of a known type. The hydrogen cell 10 can comprise a generator 11 in fluid passage connection with said cell 1 and configured to produce electrical energy by exploiting said vaporized liquid.

The generator 11 is available in fluid passage connection with the cell 1 through the connector 9.

The hydrogen cell 10 can comprise a connection 12 configured to place a heating system (for example of a building) in a fluid passage connection with the combustion device 1 and/or generator 11 so as to receive the vaporized liquid therefrom and introduce it into said heating system.

The connection 12 is available in a fluid passage connection with the cell 1 through the connector 9.

The hydrogen cell 10 can comprise a pump 13 for controlling the release of steam from the combustion device 1 and in detail from the box-like body 2.

Operation of the device 1 and therefore of the cell 10 previously described in structural terms is the following introduces a new process for exploiting a feed gas comprising at least hydrogen.

The process is configured to be carried out by the combustion device 1 and in detail by the hydrogen cell 10.

The exploitation process can comprise a preheating phase in which at least the first plate 3 and in detail both plates 3 and 4 are brought to said preheating temperature.

In this phase the heater 5, using the resistors 51 and 52, heats the plates 3 and 4 to the preheating temperature.

The exploitation process can comprise a loading step in which a potential difference is obtained between the plates 3 and 4 defining an electric arc between the same plates 3 and 4.

The values of the potential difference are shown above.

In the loading phase, the generator 6, exploiting the supply current flowing through the electrodes 61 and 62, charges both plates 3 and 4 which suitably identify the plates of a condenser.

The values of the supply current are shown above.

It is evident that the loading phase is carried out continuously for the entire exploitation process so as to have always said potential difference between the plates 3 and 4.

Once that between the plates 3 and 4 there is said potential difference, realizing the conditions for having said arc and, in detail, at least the first plate 3 is at the preheating temperature, the exploitation process can comprise a heat production phase in in which the feed gas is introduced into the chamber 1a through at least part of the holes 32 so that the hydrogen passes through the first plate 3, heating up and then enters the chamber 1a where it is ionized by said electric arc.

The hydrogen thus ionized gives rise with the comburent to an exothermic combustion process. In detail, ionized hydrogen reacts with oxygen giving rise to an exothermic oxidation process. The exothermic process leads to the production of heat which heats the plates 3 and/or 4 and suitably the feed gas reducing the contribution of the heater 5

Preferably the feed gas is introduced into the chamber 1a through the detail of all the holes 32.

Conveniently also the comburent is introduced into the chamber 1a through the holes 32 and is therefore heated by the heater 5.

In the production phase, the feed gas in the chamber 1a, passing through the first plate 3, can heat up to at least the preheating temperature.

In the production phase, when the feed gas and in detail the hydrogen reach chamber 1a and fill at least part of chamber 1a, identifying the dielectric between plates 3 and 4. Consequently, the dielectric strength between plates 3 and 4 is lowered.

At this point the electrical voltage between plates 3 and 4 (or rather the potential difference between plates 3 and 4) exceeds the dielectric strength limit of hydrogen (in detail of the supply gas). Consequently, between the plates 3 and 4 a discharge is generated between the plates 3 and 4 and therefore at least an electric arc which ionizes at least part of the hydrogen present in the chamber 1a.

It should be noted that in the production phase several electric arcs can occur between plates 3 and 4 simultaneously and/or in succession.

The generation of the at least one electric arc leads to the production of ionized hydrogen which can give rise to an exothermic process of combustion with the comburent and in particular to an exothermic process of oxidation with oxygen. This exothermic process thus leads to the production of heating heat at least said plates 3 and 4.

It can be seen how this heat production heats the plates 3 and 4 beyond the preheating temperature in detail up to a normal temperature. Consequently, the feed gas heats up further, further favouring the ionization of hydrogen in the production phase.

It is highlighted how the temperature increase of the supply gas can lead to a favourable variation of the characteristics of the dielectric between plates 3 and 4 (or rather of said gas) and therefore to a greater generation of electric arcs between plates 3 and 4 and to in turn a better ionization of hydrogen.

The steady state temperature can be substantially at least equal to 100° C. and in detail to 250 and more in detail to 1000° C.

The exploitation process can comprise a vaporization phase wherein a liquid is introduced into the box-like body and in detail against the plates 3 and 4.

This liquid, thanks to the heat developed by the at least one electric arc, is vaporized.

The production and vaporization phases can be carried out continuously.

The production and vaporization phases can be performed in parallel.

The exploitation process can comprise a phase of using the vapor produced in the vaporization phase.

In the use phase, the steam, suitably controlled by the pump 13, is extracted from the box-like body and conducted to the generator 11 to produce electrical energy and/or to the connection 12 and then to a heating system.

The combustion device 1 and therefore the hydrogen cell 10 according to the invention achieve important advantages.

In fact, the device 1 and therefore the hydrogen cell 10 are small in size and above all characterized by extreme constructive simplicity and therefore by particularly low production and maintenance costs.

Another advantage is represented by the high reliability of the device 1 and of the hydrogen cell 10.

An important advantage is represented by the fact that the combustion device 1, thanks to the passage of the supply gas in the first plate 3 and in particular by the particular conditions physical and electrical power of the chamber 1a, is able to ensure a high production of heat (therefore electrical and/or heating energy) with reduced quantities of hydrogen.

A fundamental advantage is therefore that the combustion device 1 and the hydrogen cell 10 make it possible to produce electricity from renewable sources without emitting any type of pollutant. They therefore find a privileged application in domestic systems where the small size of the system keeps the costs of the technology used low and the recovery of the steam formed is maximized by the immediate recovery for the heating system and the generation of sanitary water.

It is also emphasized that chamber 1a, thanks to the particular conditions wherein it is found (such as temperature and/or concentration of hydrogen and/or comburent), favours the hydrogen combustion process which can occur almost spontaneously, or rather without the use of catalysts and/or pilot lights.

The invention is susceptible of variants falling within the scope of the inventive concept defined by the claims.

For example, the second plate 4 can comprise at least one additional through hole and in detail a plurality of additional through holes suitably having axes of preferred extension substantially parallel to each other.

Each additional hole can have a preferred extension axis substantially transverse and in detail substantially perpendicular to the second surface 41.

Each additional hole can have a diameter substantially at least equal to 0.05 cm in detail to 0.1 cm and for the accuracy substantially comprised between 0.1 cm and 0.3 cm. 100° C. Preferably said diameter is substantially equal to 0.15 cm.

In the case of the second plate 4 provided with at least one additional hole, the injection system 7 can introduce feed gas into the chamber 1a through, in addition to said at least one hole 32, at least some and, more precisely, the entirety of said at least one additional hole.

The injection system 7 can thus comprise, for each additional hole, an additional injector for injecting the supply gas into the additional hole; and suitably the feeder 72 is in fluid passage connection with said at least one additional injector.

The additional injector is constrained to an additional hole on the opposite side to the second first surface 41.

The feeder 72 can be external to the housing volume.

In this context, all the details can be replaced by equivalent elements and the materials, shapes and dimensions can be any.

The invention claimed is:

1. A hydrogen combustion device characterized by comprising
at least one condenser comprising a first plate defining a first surface comprising a plurality of holes passing through and transversal to said first surface and a second plate defining a second surface parallel to and facing said first surface and not in contact with said first surface so as to define a chamber between said surfaces;

a heater of at least said first plate defining a preheating temperature of said at least to the first plate;

an injection system configured to introduce a supply gas through at least part of said holes then enters said chamber in the direction of said second surface; said feed gas comprising hydrogen and a comburent so that, when introduced into said chamber by said injection system, at least said hydrogen passes through at least part of said holes being heated by said first plate;

at least one generator defining a potential difference between said plates; said potential difference being configured to define between said plates an ionizing electric arc called hydrogen in said chamber.

2. The combustion device according to claim 1, wherein said potential difference between said plates is substantially at least equal to 4000V.

3. The combustion device according to claim 1, wherein said generator is configured to define said potential difference with a supply current of amperage substantially between 0.05 A and 0.01 A.

4. The combustion device according to claim 1, wherein the distance between said surfaces and therefore the height of said chamber is substantially between 0.05 cm and 0.2 cm.

5. The combustion device according to claim 1, wherein said heater is configured to define for said at least the first plate a preheating temperature substantially between 100° C. and 250° C.

6. The combustion device according to claim 1, wherein said first surface is notched and said second surface is notched in negative with respect to said first surface.

7. The combustion device according to claim 1, wherein said plates are made of tungsten.

8. The combustion device according to claim 1, comprising an adduction member configured to throw a liquid against said plates.

9. A hydrogen cell comprising at least one of said cell according to claim 1.

10. The combustion device according to claim 2, wherein said generator is configured to define said potential difference with a supply current of amperage substantially between 0.05 A and 0.01 A.

* * * * *